(12) United States Patent
Lee et al.

(10) Patent No.: US 8,323,819 B2
(45) Date of Patent: Dec. 4, 2012

(54) BATTERY MODULE OF IMPROVED COOLING EFFICIENCY

(75) Inventors: BumHyun Lee, Seoul (KR); Jin Kyu Lee, Busan (KR); Dal Mo Kang, Daejeon (KR); Jongmoon Yoon, Daejeon (KR); Hee Soo Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/286,824

(22) Filed: Nov. 1, 2011

(65) Prior Publication Data

US 2012/0107664 A1    May 3, 2012

Related U.S. Application Data

(63) Continuation of application No. PCT/KR2010/004031, filed on Jun. 22, 2010.

(30) Foreign Application Priority Data

Jul. 27, 2009 (KR) .......................... 10-2009-0068529

(51) Int. Cl.
*H01M 10/50* (2006.01)
*H01M 2/10* (2006.01)
(52) U.S. Cl. ........................................ 429/120; 429/186
(58) Field of Classification Search .................. None
See application file for complete search history.

(56) References Cited

U.S. PATENT DOCUMENTS

| 2011/0027640 A1* | 2/2011 | Gadawski et al. | 429/120 |
| 2011/0206964 A1* | 8/2011 | Odumodu et al. | 429/120 |

FOREIGN PATENT DOCUMENTS

| JP | 2009-9889 A | 1/2009 |
| JP | 2009-147187 A | 7/2009 |
| KR | 10-2003-0066765 A | 8/2003 |
| WO | WO 98/31059 A1 | 7/1998 |

OTHER PUBLICATIONS

Machine translation of JP 2009-009889, Jan. 2009.*
International Search Report, dated Feb. 28, 2011, issued in PCT/KR2010/004031.

* cited by examiner

*Primary Examiner* — Jonathan Crepeau
(74) *Attorney, Agent, or Firm* — Birch, Stewart, Kolasch & Birch, LLP

(57) ABSTRACT

Disclosed herein is a battery module configured to have a structure in which a plurality of plate type battery cells is mounted in a module case so that the battery cells are arranged adjacent to one another. The battery module includes a plurality of insulative members disposed between the respective battery cells so that each of the insulative members corresponds to the peripheral shape of a corresponding one of the battery cells and a plurality of cooling members disposed at the interfaces between the respective battery cells. Each of the cooling members includes a heat dissipating fin disposed in contact with the outer surface of a corresponding one of the battery cells and a coolant conduit provided at the lower end of the heat dissipating fin.

17 Claims, 5 Drawing Sheets

BATTERY MODULE OF IMPROVED COOLING EFFICIENCY

This application is a Continuation of PCT/KR2010/004031 filed on Jun. 22, 2010, which claims priority under U.S.C. 119(a) to Patent Application No. 10-2009-0068529 filed in Republic of Korea on Jul. 27, 2009, all of which are hereby expressly incorporated by reference into the present application.

TECHNICAL FIELD

The present invention relates to a battery module with improved cooling efficiency, and, more particularly, to a battery module configured to have a structure in which a plurality of plate type battery cells is mounted in a module case so that the battery cells are arranged adjacent to one another, the battery module including a plurality of insulative members disposed between the respective battery cells so that each of the insulative members corresponds to the peripheral shape of a corresponding one of the battery cells and a plurality of cooling members disposed at the interfaces between the respective battery cells, wherein each of the cooling members includes a heat dissipating fin disposed in contact with the outer surface of a corresponding one of the battery cells and a coolant conduit provided at the lower end of the heat dissipating fin.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals so that heat generated during charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells are mounted in a cartridge, and a plurality of cartridges is stacked to constitute a battery module. In order to effectively remove heat accumulating between the stacked battery cells or between the stacked battery modules, coolant channels may be defined between the stacked battery cells or between the stacked battery modules.

In this structure, however, it is necessary to provide a plurality of coolant channels corresponding to the number of the battery cells with the result that the overall size of the battery module is increased.

In particular, in a case in which the cooling structure is based on a water cooling type cooling system, a plurality of coolant channels is defined between the battery cells or between the battery modules with the result that it is very difficult to design the cooling structure. In addition, if the leakage of a coolant occurs, the battery cell may be damaged due to moisture.

Furthermore, in a case in which a cooling member is mounted at a specific region of each of the battery modules to constitute the cooling structure, the size of each of the battery modules is increased. For example, in a case in which the cooling member includes a cooling fin and a thermal conduction member, it may be not possible to obtain desired cooling efficiency due to thermal conduction resistance between the cooling fin and the thermal conduction member.

Consequently, there is a high necessity for a battery module which provides high power and large capacity, which can be manufactured in a simple and compact structure and which exhibits excellent cooling efficiency and safety.

DISCLOSURE

Technical Problem

Therefore, the present invention has been made to solve the above problems, and other technical problems that have yet to be resolved.

Specifically, it is an object of the present invention to provide a battery module configured so that each coolant conduit is integrally formed at the lower end of each heat dissipating fin, thereby minimizing damage to battery cells when the leakage of a coolant occurs, restraining the increase in overall size of the battery module and maximizing cooling efficiency.

It is another object of the present invention to provide a battery module configured so that insulative members are disposed between the respective battery cells, and cooling members are mounted at the interfaces between the respective battery cells, thereby protecting the heat dissipating fins and the battery cells from external impact and structurally reinforcing the peripheral regions, which are weak regions, of the respective battery cells.

Technical Solution

In accordance with one aspect of the present invention, the above and other objects can be accomplished by the provision of a battery module configured to have a structure in which a plurality of plate type battery cells is mounted in a module case so that the battery cells are arranged adjacent to one another, the battery module including a plurality of insulative members disposed between the respective battery cells so that each of the insulative members corresponds to the peripheral shape of a corresponding one of the battery cells; and a plurality of cooling members disposed at the interfaces between the respective battery cells, wherein each of the cooling members includes a heat dissipating fin disposed in contact with the outer surface of a corresponding one of the battery cells and a coolant conduit provided at the lower end of the heat dissipating fin so that a liquid coolant flows along the coolant conduit.

That is, in the battery module according to the present invention, the coolant conduit of each of the cooling members is located at the lower end of the heat dissipating fin. Therefore, it is possible to minimize damage to the battery cells due to moisture when the leakage of the coolant occurs.

Also, the liquid coolant, supplied into the battery module through the coolant conduits, performs heat exchange with the heat dissipating fins mounted at the interfaces between the respective battery cells in the battery module to cool the respective battery cells. Consequently, it is possible to configure the battery module in a compact structure so that the battery module exhibits high cooling efficiency without using additional thermal conduction members.

In addition, the insulative members, each corresponding to the peripheral shape of a corresponding one of the battery cells, are disposed between the respective battery cells. Consequently, it is possible for the heat dissipating fins to be stably fixed to the interfaces between the respective battery cells and. Also, it is possible to protect the battery cells and the heat dissipating fins from external impact.

The battery cells may be plate type battery cells having a small thickness and a relatively large width and length so as to minimize the overall size of the battery cells when the battery cells are stacked to constitute a battery module. Preferred examples of such a plate type battery cell may include a prismatic battery cell and a pouch-shaped battery cell. In particular, the pouch-shaped battery cell, which is configured so that an electrode assembly having a cathode/separator/anode structure is mounted in a battery receiving part, and a battery case formed of a laminate sheet including a metal layer and a resin layer is sealed by thermal welding so that sealing portions are formed at the peripheral region of the battery case, is preferably used.

In a preferred example, each of the insulative members may be disposed between the peripheral regions of the neighboring battery cells in a state in which each of the insulative members is elastically pressed.

Consequently, the insulative members disposed between the respective battery cells function to insulate the battery cells from each other, to improve structural stability of a battery cell stack and to help the cooling members to be effectively fixed between the respective battery cells. In particular, for the pouch-shaped battery cells, the insulative members prevent the sealing portions, which are structurally weak, formed at the peripheral region of the battery case from being separated from each other by gas generated from the battery cells during charge and discharge of the battery cells or prevent external moisture from being introduced into the battery cells through the sealing portions.

The material for each of the insulative members disposed between the peripheral regions of the respective battery cells is not particularly restricted so long as each of the insulative members is formed of a material exhibiting elastic pressing force when each of the insulative members is pressurized. Preferably, each of the insulative members is formed of an expanded mold product. Each of the insulative members may have a structure or shape exhibiting elasticity. As a concrete example, each of the insulative members may be formed of expanded polypropylene (EPP).

The heat dissipating fin and the coolant conduit constituting each of the cooling members may be integrally formed. That is, the coolant conduit, along which the liquid coolant flows, is integrally formed at the heat dissipating fin to fundamentally prevent the occurrence of thermal conduction resistance between the heat dissipating fin and the coolant conduit, thereby more efficiently cooling the battery module.

In the above-described structure, each of the cooling members may be configured to have an integrated structure, for example, including a plate type heat dissipating fin and a coolant conduit formed by bending one end of the heat dissipating fin in the shape of a circle in vertical section. According to circumstances, the end of the coolant conduit bent in the shape of a circle in vertical section may be coupled to the heat dissipating fin. In this case, the end of the coolant conduit may be coupled to one side of the heat dissipating fin, for example, by welding.

In a preferred example, the coolant conduit of each of the cooling members may be surrounded by a corresponding one of the insulative members. Consequently, it is possible to minimize damage to the coolant conduit due to external impact or damage to a corresponding one of the battery cells due to the damaged coolant conduit. Also, even when the leakage of the liquid coolant from the coolant conduit occurs, it is possible to prevent the liquid coolant from being discharged out of a corresponding one of the insulative members The material for each of the cooling members is not particularly restricted so long as each of the cooling members is formed of a material exhibiting high thermal conductivity. For example, each of the cooling members may be formed of a metal material.

Meanwhile, the module case is provided at the lower parts of the front and rear thereof with a coolant input port and a coolant outlet port, respectively, which communicate with the coolant conduits.

In a preferred example, the battery module may further include a manifold mounted between a battery cell stack and the module case to connect the coolant conduits of the battery cell stack to the coolant input port or the coolant outlet port of the module case. That is, an external liquid coolant may be introduced into the coolant inlet port. The introduced liquid coolant may flow along the respective coolant conduits via the manifold. At this time, the battery module may be cooled by thermal conduction of the heat dissipating fins. Afterwards, the liquid coolant may be discharged to the outside through the coolant outlet port.

Consequently, the manifold may be flexibly configured and disposed in a cooling system of the battery module based on the number of the coolant conduits.

In this structure, the manifold may be provided at regions thereof connected to the respective coolant conduits, the coolant input port and the coolant outlet port with annular ribs. Consequently, it is possible to easily connect the coolant conduits to the manifold via the annular ribs. Also, the annular ribs may function to reduce stress and strain of the manifold.

The manifold may be formed of an insulative material. Alternatively, the manifold may be formed of a thermally conductive material. In a case in which the manifold is formed of the insulative material, it is possible for the manifold to electrically insulate the battery cells and the surroundings of the battery cells from each other. In a case in which the manifold is formed of the thermally conductive material, on the other hand, it is possible for the manifold to easily conduct heat generated from the battery cells to the module case or the like, thereby further improving cooling efficiency of the battery module. Also, the manifold may be formed of a rubber material to increase sealing force at the connection regions thereof.

According to circumstances, the battery module may further include an insulative cartridge configured to surround the battery cells, the insulative members and the cooling members so as to increase mechanical strength of the battery module. The cartridge is provided at positions thereof corresponding to the coolant input port and the coolant outlet port with openings. Consequently, the introduction and discharge of the coolant are not disturbed by the cartridge.

The liquid coolant is not particularly restricted so long as the liquid coolant easily flows along the coolant conduits while exhibiting high cooling efficiency. For example, the liquid coolant may include water having hit latent heat.

For reference, the module case used in the present invention may be configured in various structures, a preferred example of which will be described hereinafter.

The module case is a high-strength cover to surround the outside of the battery module. The module case may be formed of a synthetic resin or a metal material. In a preferred example, the module case may be configured in the form of a block in which a portion of one side of the block and a portion of the other side of the block slightly protrude to improve structural stability of the battery module when a middle or large-sized battery pack is constituted by combining a plurality of battery modules. In this structure, particularly when the battery cells expand during charge and discharge of the battery cells, expansion stress concentrates on the protruding regions of the module case so that electrical connection regions of the battery cells are short circuited during the concentration of the expansion stress, thereby securing the stability of the battery module.

Meanwhile, a middle or large-sized battery pack includes a plurality of battery modules so as to provide high power and large capacity. It is necessary for the battery modules constituting the middle or large-sized battery pack to exhibit higher heat dissipation efficiency to secure the safety of the battery pack.

In accordance with another aspect of the present invention, therefore, there is provided a middle or large-sized battery pack manufactured by combining a plurality of battery modules to achieve desired power and capacity.

The middle or large-sized battery pack according to the present invention is well suited to use as a power source for electric vehicles, hybrid electric vehicles and plug-in hybrid electric vehicles, the safety of which may be seriously deteriorated due to high-temperature heat generated from a plurality of battery cells combined to provide high power and large capacity during the charge and discharge of the battery cells.

In particular, in electric vehicles and plug-in hybrid electric vehicles requiring high power for a long period of time, excellent heat dissipation is needed. In accordance with this aspect, the middle or large-sized battery pack according to the present invention is more preferably used in the electric vehicles and the plug-in hybrid electric vehicles.

In accordance with a further aspect of the present invention, there is provided a member assembly mounted at the outside of a battery cell or a battery module to cool the battery cell or the battery module.

Specifically, the member assembly includes a cooling member and an insulative member. The cooling member includes a heat dissipating fin and a coolant conduit, the heat dissipating fin being disposed in contact with the outer surface of the battery cell, the coolant conduit being integrally formed at one end of the heat dissipating fin, and the insulative member is configured in a frame structure corresponding to the peripheral shape of the battery cell so that the heat dissipating fin is exposed, the coolant conduit being surrounded by the insulative member.

Consequently, it is possible to design a battery module that minimizes damage to the battery cells due to moisture when the leakage of a liquid coolant occurs and is configured in a compact structure while providing improved cooling efficiency based on high thermal conductivity Furthermore, it may not be possible to obtain desired cooling efficiency due to thermal conduction resistance between thermal conduction members, such as heat sinks, used upon configuration of the cooling structure in the conventional art; however, the member assembly according to the present invention solves such a problem. Consequently, it is possible for the member assembly according to the present invention to improve cooling efficiency.

Also, when insulative members are mounted between battery cells so that each of the insulative members corresponds to the peripheral shape of a corresponding one of the battery cells, heat dissipating fins are stably fixed to the interfaces between the battery cells, and the heat dissipating fins and the battery cells are protected from external impact, as previously described. For a pouch-shaped battery cell, the insulative members prevent sealing portions, which are structurally weak, formed at the peripheral region of a battery case from being separated from each other by gas generated from the battery cell during charge and discharge of the battery cell or prevent external moisture from being introduced into the battery cell through the sealing portions.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
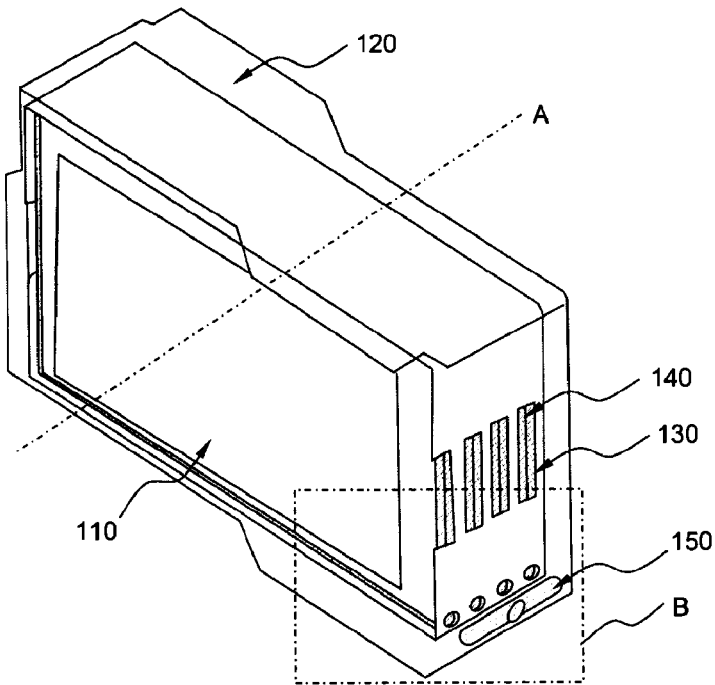
FIG. 1 is a typical view illustrating a battery module according to an embodiment of the present invention.
Figure 2:
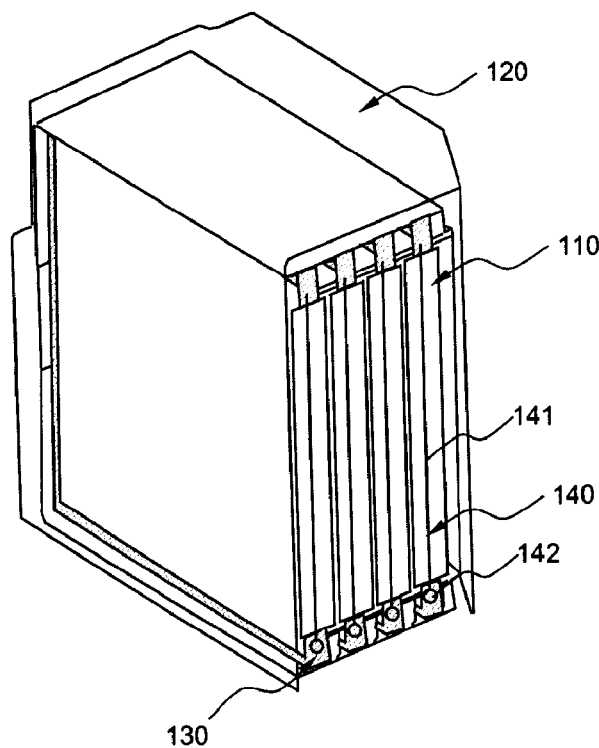
FIG. 2 is a typical vertical sectional view taken in a direction A of FIG. 1.

FIG. 1 is a typical view illustrating a battery module according to an embodiment of the present invention, and FIG. 2 is a typical vertical sectional view taken in a direction A of FIG. 1.

Referring to these drawings, a battery module 100 includes a plurality of plate type battery cells 110 mounted in a module case 120 so that the battery cells 110 are arranged adjacent to one another in the lateral direction, insulative members 130 disposed between the respective battery cells so that each of the insulative members 130 corresponds to the peripheral shape of a corresponding one of the battery cells 110, and cooling members 140 disposed at the interfaces between the respective battery cells 110.

Each of the cooling members 140 includes a heat dissipating fin 141 disposed in contact with the outer surface of a corresponding one of the battery cells 110 and a coolant conduit 142 provided at the lower end of the heat dissipating fin 141 so that a liquid coolant can move along the coolant conduit 142.

The module case 120 is configured in the form of a block in which a portion of one side of the block and a portion of the other side of the block slightly protrude to improve structural stability of the battery module when a battery pack (not shown) is constituted by combining a plurality of battery modules 100. Also, when the battery cells 110 expand during charge and discharge of the battery cells 110, expansion stress concentrates on the protruding regions of the module case so that electrical connection regions of the battery cells 110 are short circuited during the concentration of the expansion stress, thereby securing the stability of the battery module 100.

Figure 3:
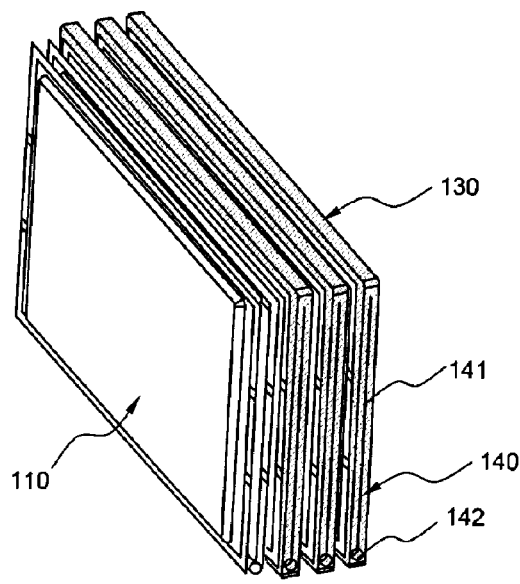
FIG. 3 is a typical view illustrating battery cells, cooling members and insulative members of FIG. 2.
Figure 4:
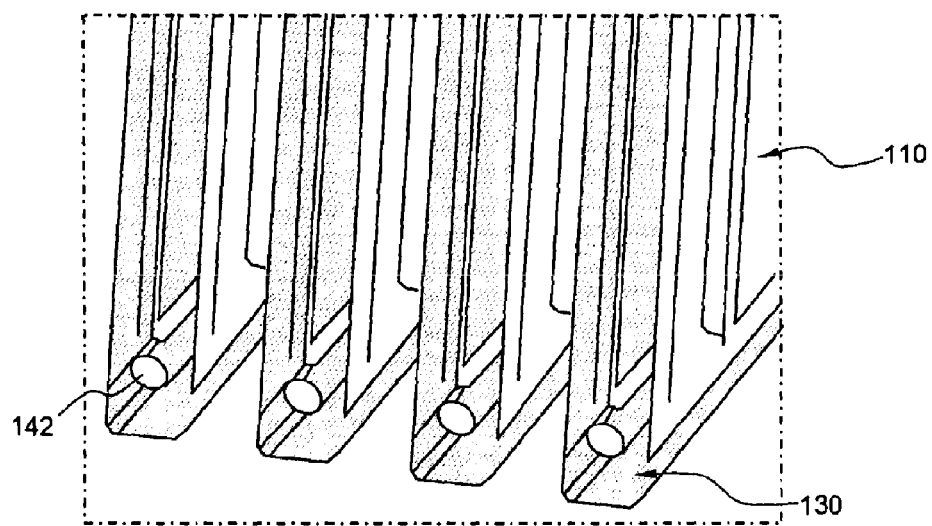
FIG. 4 is a partially enlarged view of FIG. 3.
Figure 5:
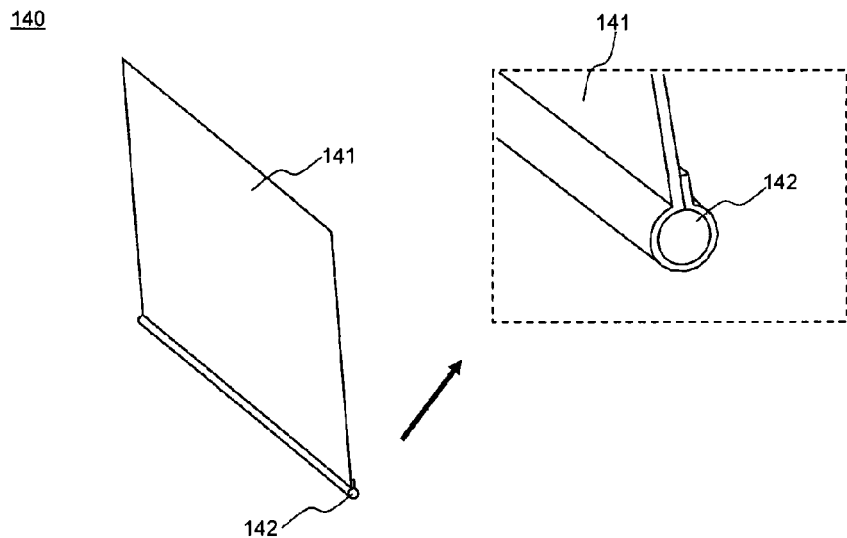
FIG. 5 is a typical view of a cooling member, the cooling member also being shown in a partially enlarged view.

FIG. 3 is a typical view illustrating battery cells, cooling members and insulative members of FIG. 2, FIG. 4 is a partially enlarged view of FIG. 3, and FIG. 5 is a typical view of a cooling member, the cooling member also being shown in a partially enlarged view.

Referring to these drawings together with FIG. 2, each insulative member 130 is disposed between the peripheral regions of the neighboring battery cells 110 in a state in which each insulative member 130 is elastically pressed. Each insulative member 130 is formed of expanded polypropylene (EPP). The insulative members 130 insulate the respective battery cells 110 from each other and increase the structural stability of a battery cell stack.

Each cooling member 140 includes a plate type heat dissipating fin 141 formed of a metal material and a coolant conduit 142 formed by bending one end of the heat dissipating fin 141 in the shape of a circle in vertical section. That is, the heat dissipating fin 141 and the coolant conduit 142 are integrally formed with the result that thermal conduction resistance occurs between the heat dissipating fin 141 and the coolant conduit 142, thereby preventing the reduction of cooling efficiency.

Also, the coolant conduit 142 of each cooling member 140 is surrounded by a corresponding one of the insulative members 130, and therefore, it is possible to minimize damage to the coolant conduit 142 due to external impact or damage to a corresponding one of the battery cells due to the damaged coolant conduit 142. Also, even when the leakage of a liquid coolant occurs, it is possible to prevent the liquid coolant from being discharged out of each insulative member 130.

Figure 6:
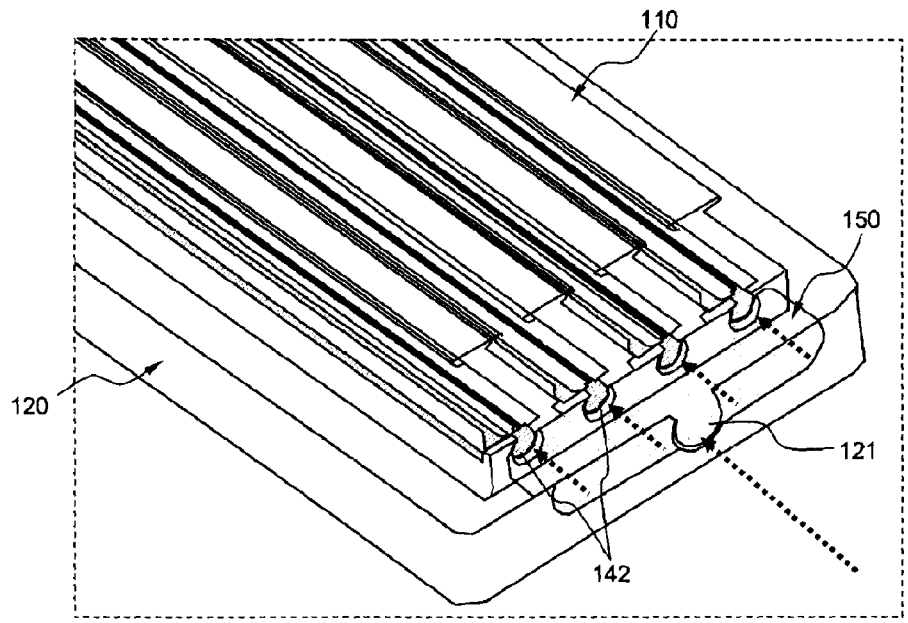
FIG. 6 is a view illustrating the internal structure of the battery module at a portion B of FIG. 1.
Figure 7:
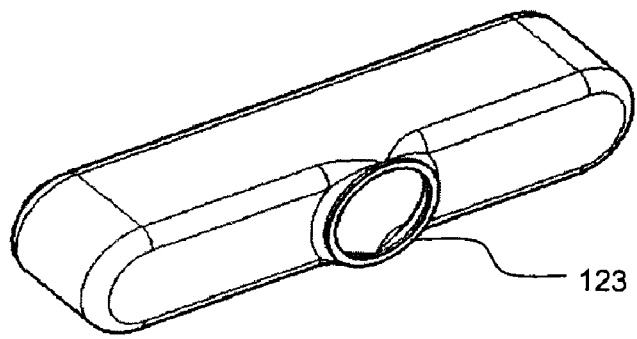
FIGS. 7 to 9 are typical views illustrating a manifold of FIG. 6.
Figure 8:
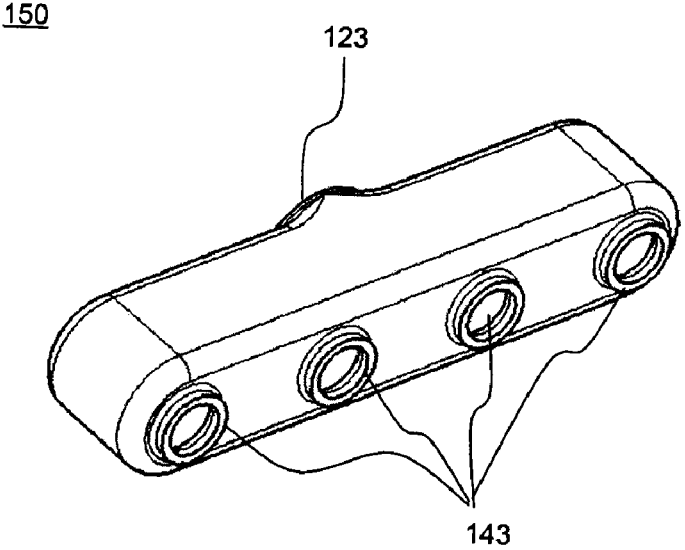
Figure 9:
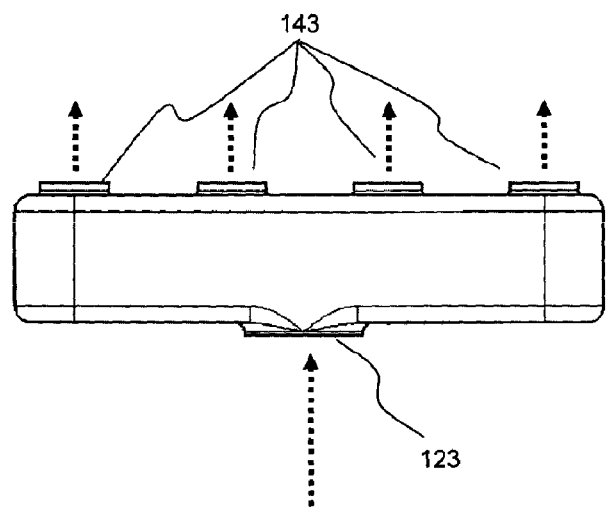

FIG. 6 is a view illustrating the internal structure of the battery module at a portion B of FIG. 1. FIG. 7 is a front perspective view of a manifold shown in FIG. 6, FIG. 8 is a rear perspective view of the manifold shown in FIG. 6, and FIG. 9 is a plan view of the manifold shown in FIG. 6.

Referring to these drawings together with FIG. 1, the module case 120 is provided at the lower part of the front thereof with a coolant inlet port 121, and a manifold 150 to connect four coolant conduits 142 of the battery cell stack to the coolant inlet port 121 of the module case 120 is mounted between the battery cell stack and the module case 120.

The structures of a coolant outlet port formed at the lower part of the rear of the module case 120 and a manifold connected to the coolant outlet port are identical to those of the coolant inlet port and the manifold connected to the coolant inlet port, and therefore, a description will not be given of the coolant outlet port and the manifold connected to the coolant outlet port.

The manifold 150 is a connection member configured in the shape of an oval cylinder. The manifold 150 is formed of a thermally conductive member. Therefore, it is possible for the manifold 150 to easily conduct heat generated from the battery cells 110 to the module case, thereby further improving cooling efficiency of the battery module.

Also, the manifold 150 is provided at regions thereof connected to the respective coolant conduits 142 with annular ribs 143. In addition, the manifold 150 is provided at a region thereof connected to the coolant inlet port 121 with an annular rib 123. The annular ribs 123 and 143 are formed of a rubber material to exhibit high sealing force at the connection regions so that the respective coolant conduits 142 can be easily fixed to the manifold 150 and to restrain the occurrence of leakage of the liquid coolant at the connection regions.

Figure 10:
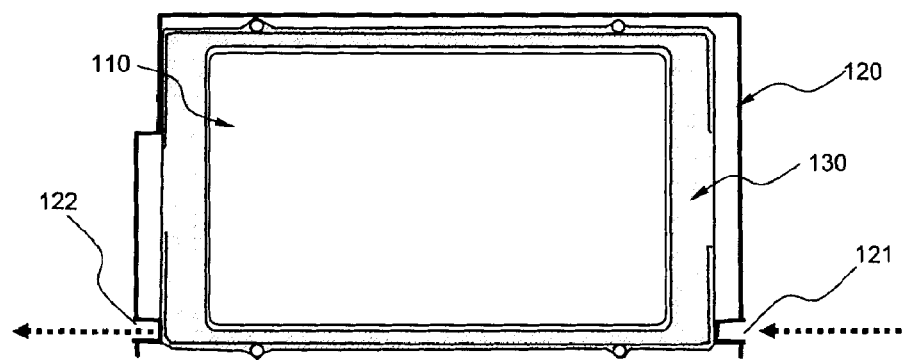
FIG. 10 is a typical side view of FIG. 1.

FIG. 10 is a typical side view of FIG. 1.

Referring to FIG. 10 together with FIG. 6, the liquid coolant is introduced through the coolant inlet port 121 located at the lower part of the battery module 100. The introduced liquid coolant flows along the four coolant conduits 142 via the manifold 150. At this time, the battery cells 110 are cooled by thermal conduction of the heat dissipating fins connected to the respective coolant conduits 142. Afterwards, the coolant is discharged to the outside through the coolant outlet port 122 located at the lower part of the battery module 100.

Since, in the battery module 100, the coolant conduit 142 of each of the cooling members 140 is located at the lower end of a corresponding one of the heat dissipating fins 141, it is possible to minimize damage to the battery cells due to the liquid coolant when the leakage of the liquid coolant occurs. Also, since the liquid coolant is supplied into the battery module through the coolant conduits 142 and performs heat exchange with the heat dissipating fins 141 mounted at the interfaces between the respective battery cells 110 in the battery module to cool the respective battery cells 110. Consequently, it is possible to configure the battery module in a compact structure.

Industrial Applicability

As is apparent from the above description, the battery module according to the present invention is configured to have a structure in which the coolant conduit of each of the cooling members is integrally formed at the lower end of a corresponding one of the heat dissipating fins. Therefore, it is possible to minimize damage to the battery cells when the leakage of the liquid coolant occurs, to restrain the increase in overall size of the battery module, and to maximize cooling efficiency.

Also, the insulative members are disposed between the respective battery cells, and the cooling members are mounted at the interfaces between the respective battery cells. Therefore, it is possible to protect the heat dissipating fins and the battery cells from external impact and to structurally reinforce the peripheral regions, which are weak regions, of the respective battery cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module configured to have a structure in which a plurality of plate type battery cells is mounted in a module case so that the battery cells are arranged adjacent to one another, the battery module comprising:
   a plurality of insulative members disposed between the respective battery cells so that each of the insulative members corresponds to the peripheral shape of a corresponding one of the battery cells; and
   a plurality of cooling members disposed at the interfaces between the respective battery cells, wherein
   each of the cooling members comprises a heat dissipating fin disposed in contact with the outer surface of a corresponding one of the battery cells and a coolant conduit provided at the lower end of the heat dissipating fin so that a liquid coolant flows along the coolant conduit, and
   wherein each insulative member is formed of an expanded mold product exhibiting elastic pressing force when the insulative member is pressurized between peripheral regions of neighboring battery cells.

2. The battery module according to claim 1, wherein each of the battery cells is configured so that an electrode assembly having a cathode/separator/anode structure is mounted in a battery receiving part, and a battery case formed of a laminate sheet comprising a metal layer and a resin layer is sealed by thermal welding so that sealing portions are formed at the peripheral region of the battery case.

3. The battery module according to claim 1, wherein each of the insulative members is formed of expanded polypropylene (EPP).

4. The battery module according to claim 1, wherein the heat dissipating fin and the coolant conduit constituting each of the cooling members are integrally formed.

5. The battery module according to claim 4, wherein each of the cooling members comprises a plate type heat dissipating fin and a coolant conduit formed by bending one end of the heat dissipating fin in the shape of a circle in vertical section.

6. The battery module according to claim 5, wherein the end of the coolant conduit bent in the shape of a circle in vertical section is coupled to the heat dissipating fin.

7. The battery module according to claim 1, wherein the coolant conduit of each of the cooling members is surrounded by a corresponding one of the insulative members.

8. The battery module according to claim 1, wherein each of the cooling members is formed of a thermally conductive metal material.

9. The battery module according to claim 1, wherein the module case is provided at the lower parts of the front and rear thereof with a coolant input port and a coolant outlet port, respectively, and the battery module further comprises a manifold mounted between a battery cell stack and the module case to connect two or more coolant conduits of the battery cell stack to the coolant input port or the coolant outlet port of the module case.

10. The battery module according to claim 9, wherein the manifold is provided at regions thereof connected to the respective coolant conduits, the coolant input port and the coolant outlet port with annular ribs.

11. The battery module according to claim 1, further comprising an insulative cartridge configured to surround the battery cells, the insulative members and the cooling members.

12. The battery module according to claim 11, wherein the cartridge is provided at positions thereof corresponding to the coolant input port and the coolant outlet port with openings.

13. The battery module according to claim 1, wherein the liquid coolant comprises water.

14. A battery pack comprising two or more battery modules according to claim 1, the number of the battery modules being set based on power and capacity of the battery pack.

15. The battery pack according to claim 14, wherein the battery pack is used as a power source for electric vehicles, hybrid electric vehicles or plug-in hybrid electric vehicles.

16. A member assembly mounted between two neighboring battery plate type cells of a battery module comprising a plurality of plate type cells mounted in a module case so that the battery cells are arranged adjacent to one another, the member assembly comprising a cooling member and an insulative member, wherein
   the cooling member comprises a heat dissipating fin and a coolant conduit, the heat dissipating fin being disposed in contact with the outer surface of a corresponding one of the battery cells, the coolant conduit being integrally formed at one end of the heat dissipating fin, and
   the insulative member is configured in a frame structure corresponding to the peripheral shape of a corresponding one of the battery cells so that the heat dissipating fin is exposed, the coolant conduit being surrounded by the insulative member.

17. A battery module configured to have a structure in which a plurality of plate type battery cells is mounted in a module case so that the battery cells are arranged adjacent to one another, the battery module comprising:
   a plurality of insulative members disposed between the respective battery cells so that each of the insulative members corresponds to the peripheral shape of a corresponding one of the battery cells; and
   a plurality of cooling members disposed at the interfaces between the respective battery cells, wherein
   each of the cooling members comprises a heat dissipating fin disposed in contact with the outer surface of a corresponding one of the battery cells and a coolant conduit provided at the lower end of the heat dissipating fin so that a liquid coolant flows along the coolant conduit, and
   wherein the heat dissipating fin and the coolant conduit constituting each of the cooling members are integrally formed.

* * * * *